(12) United States Patent
Zhao et al.

(10) Patent No.: US 10,678,564 B2
(45) Date of Patent: Jun. 9, 2020

(54) ANDROID-BASED POP-UP PROMPT METHOD AND DEVICE

(71) Applicant: Alibaba Group Holding Limited, George Town (KY)

(72) Inventors: Xiangyu Zhao, Hangzhou (CN); Liangzi Ding, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/131,701

(22) Filed: Sep. 14, 2018

(65) Prior Publication Data
US 2019/0012190 A1 Jan. 10, 2019

Related U.S. Application Data

(63) Continuation of application No. PCT/CN2017/075520, filed on Mar. 3, 2017.

(30) Foreign Application Priority Data

Mar. 16, 2016 (CN) .............................. 2016 1 015785

(51) Int. Cl.
*G06F 9/451* (2018.01)
(52) U.S. Cl.
CPC .................................... *G06F 9/451* (2018.02)
(58) Field of Classification Search
CPC ................................. G06F 9/451; G06F 9/44
See application file for complete search history.

(56) References Cited

U.S. PATENT DOCUMENTS

2004/0210847 A1* 10/2004 Berson ..................... G01D 7/08
715/788
2006/0070008 A1* 3/2006 Sauve ..................... G06F 9/451
715/788
(Continued)

FOREIGN PATENT DOCUMENTS

| CN | 102063325 | 5/2011 |
| CN | 102156615 | 8/2011 |

(Continued)

OTHER PUBLICATIONS

Zhang; "Detailed Explanation for Activity Assembly of Android"; https://www.ibm.com/developerworks/cn/opensourcan.cn.e/osdroid-actvt/; Jan. 22, 2010.
(Continued)

*Primary Examiner* — Charles E Anya
(74) *Attorney, Agent, or Firm* — Fish & Richardson P.C.

(57) ABSTRACT

The present disclosure includes systems and methods for providing popups, including the following computer-implemented method. A trigger event is received that is generated by detection of a request for a presentation of a pop-up window. Based on the received trigger event, an activity pop-up component is launched that is configured to output the pop-up window, where a launch mode of the activity pop-up component is preconfigured as a single task mode. A determination is made whether the pop-up window output by the activity pop-up component is obscured by a pre-existing pop-up window. Upon determining that the pop-up window output by the activity pop-up component is obscured by the pre-existing pop-up window, the activity pop-up component is relaunched to trigger movement of the pop-up window to the top of an activity stack to force a non-obscured display of the pop-up window.

8 Claims, 4 Drawing Sheets

(56) References Cited

U.S. PATENT DOCUMENTS

| | | | | |
|---|---|---|---|---|
| 2008/0295025 | A1* | 11/2008 | Gyure | G06F 3/048 715/808 |
| 2012/0072867 | A1* | 3/2012 | Schlegel | G06F 3/0481 715/808 |
| 2014/0164991 | A1* | 6/2014 | Kim | G06F 3/0481 715/794 |
| 2014/0237405 | A1* | 8/2014 | Wu | G06F 9/451 715/765 |
| 2014/0340332 | A1 | 11/2014 | Lemay | |
| 2015/0072641 | A1* | 3/2015 | Raleigh | G06Q 30/016 455/406 |
| 2015/0212810 | A1 | 7/2015 | Lu et al. | |
| 2015/0248723 | A1* | 9/2015 | Chandi | G06F 16/95 705/27.1 |
| 2015/0371363 | A1* | 12/2015 | Kritt | G06T 3/40 715/800 |
| 2016/0055306 | A1* | 2/2016 | Ozeki | G06Q 10/063114 705/2 |
| 2016/0098159 | A1* | 4/2016 | McCann | G06F 3/04817 715/765 |

FOREIGN PATENT DOCUMENTS

| | | |
|---|---|---|
| CN | 103559035 | 2/2014 |
| CN | 104123499 | 10/2014 |
| CN | 104360794 | 2/2015 |
| CN | 104572110 | 4/2015 |
| CN | 104915090 | 9/2015 |

OTHER PUBLICATIONS

International Search Report by the International Searching Authority issued in International Application No. PCT/CN2017/075520 dated May 27, 2017; 11 pages.

Hong; "Android Using Activity as Pop-Up Dialog Box"; http://blog.csdn.net/lmj623565791/article/details/23116115, Apr. 7, 2014; p. 2, paragraph 1 to p. 3, last paragraph.

Extended European Search Report in European Application No. 17765728.5, dated Oct. 22, 2019, 10 pages.

Javatpoint.com [online], "Android Activity Lifecycle—javatpoint," Mar. 2016, retrieved on Oct. 22, 2019, retrieved from URL<http://www.javatpoint.com/android-life-cycle-of-activity>, 7 pages.

Kapoor et al., CodeRanch.com [online], "Activity Instance always on top of its Activity Stack," Jan. 2013, retrieved on Oct. 22, 2019, retrieved from URL<https://coderanch.com/t/603312/Activity-Instance-top-Activity-Stack>, 3 pages.

Nuuneoi, IntheCheeseFactory.com, [online], "Understand Android Activity's launchMode: standard, singleTop, singleTask and singleInstance," Apr. 2015, retrieved on Oct. 22, 2019, retrieved from URL<https://inthecheesefactory.com/blog/understand-android-activity-launchmode/en>, 21 pages.

Srinivasan, Javabeat.net [online], "How to create Dialog activity in Android?," retrieved on Oct. 22, 2019, retrieved from URL<https://javabeat.net/dialog-activity-android/>, 15 pages.

Stackoverflow.com [online], "Android—How to restart activity (or bring it to front) on pause," Jul. 2015, retrieved on Oct. 22, 2019, retrieved from URL<http://stackoverflow.com/questions/12886927/android-how-to-restart-activity-orbring-it-to-front-on-pause>, 8 pages.

PCT International Preliminary Report on Patentability in International Application No. PCT/CN2017/075520, dated Sep. 18, 2018, 8 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Farwmarth [online], "Android Component Activity," Apr. 5, 2014, retrieved on Dec. 4, 2019, retrieved from URL<https://farwmarth.com/post/android-%E7%BB%84%E4%BB%B6activity/>, 10 pages (with machine translation).

* cited by examiner

ANDROID-BASED POP-UP PROMPT METHOD AND DEVICE

CROSS-REFERENCE TO RELATED APPLICATIONS

This application is a continuation of PCT Application No. PCT/CN2017/075520, filed on Mar. 3, 2017, which claims priority to Chinese Patent Application No. 201610150785.X, filed on Mar. 16, 2016, and each application is hereby incorporated by reference in its entirety.

TECHNICAL FIELD

The present application relates to the communications field, and in particular, to an Android-based pop-up prompt method and device.

BACKGROUND

In an Android system, for some events for which a pop-up needs to be output to a user, the system can output a pop-up filled with a prompt text to the user. For example, the event can be a single device login event. The single device login usually means that the user is allowed to log in to only one device by using an account. Once the user logs in to another device by using the same account, the user is forced to exit the login state from the current device. When detecting a single device login event, the system can output a pop-up to the user to prompt the user that a current login account is already used to log in to another device. In this case, a prompt text in the pop-up can include the reason why the user is forced to exit the login state. However, in a related technology, when the Android system outputs a pop-up to a user, the output pop-up is possibly obscured by another pop-up or another page, affecting the use of an APP or a basic function of a system terminal by the user.

SUMMARY

The present application provides an Android-based pop-up prompt method, where the method includes the following: when a trigger event prompted by a pop-up is detected, launching an activity pop-up component to output the pop-up, where a launch mode of the activity pop-up component is preconfigured as a single task mode; determining whether the activity pop-up component is obscured by another activity component; and when the activity pop-up component is obscured by another activity component, relaunching the activity pop-up component to trigger movement of the activity pop-up component to the top of an activity stack, so the pop-up is displayed on a system front end.

Optionally, the determining whether the activity pop-up component is obscured by another activity component includes the following: determining whether an onPause or onStop method of the activity pop-up component is called; and when the onPause or onStop method of the activity pop-up component is called, determining that the activity pop-up component is obscured by another activity component.

Optionally, the relaunching the activity pop-up component when the activity pop-up component is obscured by another activity component includes the following: when the onPause method of the activity pop-up component is called, relaunching the activity pop-up component based on the onPause method; and when the onStop method of the activity pop-up component is called, determining whether the onPause method of the activity pop-up component is already called, and if the onPause method is not called, relaunching the activity pop-up component based on the onStop method.

Optionally, the relaunching the activity pop-up component based on the onPause method or the onStop method includes the following: determining whether the call of the onPause method or the onStop method is triggered by a disabling event for the activity pop-up component; and if the call of the onPause method or the onStop method is not triggered by the disabling event for the activity pop-up component, relaunching the activity pop-up component based on the onPause method or the onStop method.

Optionally, the method further includes the following: if the call of the onPause method or the onStop method is triggered by the disabling event for the activity pop-up component, normally disabling the activity pop-up component.

The present application further provides an Android-based pop-up prompt device, where the device includes the following: a launching module, configured to launch an activity pop-up component to output the pop-up when a trigger event prompted by a pop-up is detected, where a launch mode of the activity pop-up component is preconfigured as a single task mode; a determining module, configured to determine whether the activity pop-up component is obscured by another activity component; and a relaunching module, configured to relaunch the activity pop-up component to trigger movement of the activity pop-up component to the top of an activity stack when the activity pop-up component is obscured by another activity component, so the pop-up is displayed on a system front end.

Optionally, the determining module is configured to determine whether an onPause or onStop method of the activity pop-up component is called; and when the onPause or onStop method of the activity pop-up component is called, determine that the activity pop-up component is obscured by another activity component.

Optionally, the relaunching module is configured to relaunch the activity pop-up component based on the onPause method when the onPause method of the activity pop-up component is called; and when the onStop method of the activity pop-up component is called, determine whether the onPause method of the activity pop-up component is already called, and if the onPause method is not called, relaunch the activity pop-up component based on the onStop method.

Optionally, the relaunching module is further configured to determine whether the call of the onPause method or the onStop method is triggered by a disabling event for the activity pop-up component; and if the call of the onPause method or the onStop method is not triggered by the disabling event for the activity pop-up component, relaunch the activity pop-up component based on the onPause method or the onStop method.

Optionally, the device further includes a disabling module, configured to normally disable the activity pop-up component if the call of the onPause method or the onStop method is triggered by the disabling event for the activity pop-up component.

In the present application, when the trigger event prompted by the pop-up is detected, the activity pop-up component is launched to output the pop-up, and the launch mode of the activity pop-up component is preconfigured as the single task mode. It is determined whether the activity pop-up component is obscured by another activity component. When the activity pop-up component is obscured by another activity component, the activity pop-up component is relaunched to trigger movement of the activity pop-up component to the top of the activity stack, so the pop-up is displayed on the system front end. Therefore, after the activity pop-up component is launched to output the pop-up to a user, it can be ensured that the pop-up is not obscured and is always displayed on the system front end.

DESCRIPTION OF IMPLEMENTATIONS

In a related technology, an Android system usually can output a pop-up to a user in the following implementations:

In an implementation, the Android system can output the pop-up by using a window component.

The pop-up output by using the window component can be output on any page and is not obscured by another page. However, the user is usually allowed to configure the pop-up output by using the window component. Therefore, the system cannot output the pop-up when the user manually prohibits the pop-up in the system.

In another implementation, the Android system can output the pop-up by using an activity component.

In the Android system, the activity component is responsible for interacting with the user. The component can provide an interaction interface and display some interaction widgets (such as buttons and pop-ups) in the interaction interface. The user can operate these interaction widgets to interact with a terminal. The terminal can detect events of the user for these interaction widgets on a back end, to complete tasks corresponding to the present interaction. The terminal outputs the pop-up by using the activity component, so any activity component in the system can be used as a main body for the pop-up to output the pop-up on any page. However, the activity component is usually managed in an activity stack. Once the activity component is obscured by another activity component in the activity stack, that is, the other activity component is on the top of the activity stack and the activity component is no longer on the top of the activity stack, the pop-up output by the activity component is obscured by another pop-up or interface and cannot be displayed on a system front end, affecting the use of an APP or a basic function of the system.

In another implementation, the Android system can output the pop-up on a fixed page.

However, the pop-up is output on the fixed page, which is not flexible and brings poor interaction experience. For example, when the pop-up is output on a login page, the output pop-up can be displayed only on the login page. After the system outputs the pop-up to the user, if the system front end displays another page, the user cannot view the pop-up output by the system unless the user actively switches to the login page. Consequently, the pop-up output by the system cannot inform the user on time.

In view of this, the present application provides an Android-based pop-up prompt method. When a trigger event prompted by a pop-up is detected, an activity pop-up component is launched to output the pop-up, and a launch mode of the activity pop-up component is preconfigured as a single task mode. It is determined whether the activity pop-up component is obscured by another activity component. When the activity pop-up component is obscured by another activity component, the activity pop-up component is relaunched to trigger movement of the activity pop-up component to the top of an activity stack, so the pop-up is displayed on a system front end. Because the activity pop-up component is in the single task mode in the present application, the activity pop-up component can be immediately moved to the top of the activity stack after being relaunched. Therefore, after the activity pop-up component is launched to output the pop-up to a user, it can be ensured that the pop-up is not obscured and is always displayed on the system front end.

In addition, in the present application, the pop-up is no longer output based on the window component in the Android system, and the user is no longer allowed to configure the pop-up, which avoids a problem that the pop-up cannot be output because the user manually prohibits the pop-up in the system.

Moreover, because the pop-up is output by using the activity pop-up component in the present application, any activity component in the system can be used as the main body to output the pop-up on any page, achieving high flexibility.

The present application is described below by using specific implementations with reference to specific application scenarios.

Figure 1:
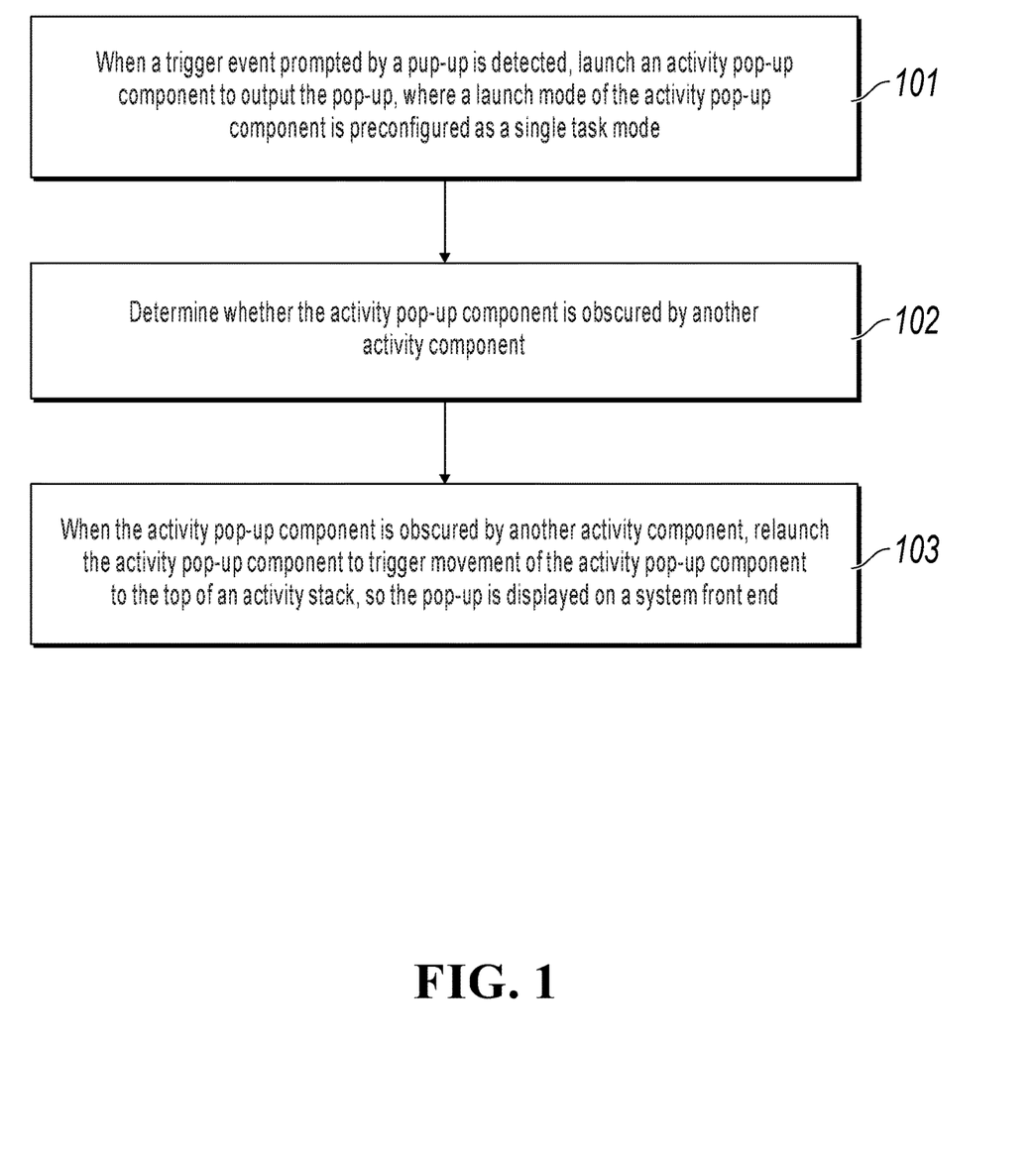
FIG. 1 is a flowchart illustrating an Android-based pop-up prompt method, according to an implementation of the present application.

Referring to FIG. 1, FIG. 1 shows an Android-based pop-up prompt method according to an implementation of the present application. The method is applied to a terminal and includes the following steps.

Step 101: When a trigger event prompted by a pop-up is detected, launch an activity pop-up component to output the pop-up, where a launch mode of the activity pop-up component is preconfigured as a single task mode.

In the present implementation, the terminal can include an intelligent terminal running an Android system, for example, a mobile terminal such as a smartphone or a tablet computer.

The trigger event prompted by the pop-up can include an event detected by the terminal system and needs to be prompted to the user by outputting the pop-up. The trigger event prompted by the pop-up can include different types of events in different application scenarios.

For example, in a single device login application scenario, the trigger event prompted by the pop-up can include a single device login event. In the present application scenario, when the user logs in to another terminal by using the same login account, the current terminal can exit the login state, and output a pop-up to the user to prompt the user with the reason for exiting the current login state.

For another example, in an incoming call answering application scenario, the trigger event prompted by the pop-up can include an incoming call event. When detecting an incoming call, the terminal system can output a pop-up to the user. In this case, the user can perform a corresponding operation for the pop-up (e.g., sliding upwards or downwards) to answer or decline the incoming call.

In the present implementation, the terminal can still output the pop-up to the user by using a predetermined activity pop-up component. After detecting the trigger event prompted by the pop-up, the terminal can launch the activity pop-up component to create an activity instance used to output the pop-up, and then fill a prompt text in the pop-up based on the instance to output the prompt text to the user.

In the Android system, the launch mode (launchMode) of the activity component usually includes four modes: standard mode, singleTop mode, singleTask mode (namely, the single task mode), and singleInstance mode.

When the activity component is in the singleTask mode, the activity pop-up component only allows a unique activity instance to run.

In the singleTask mode, after the activity pop-up component is launched, the system determines whether an activity instance corresponding to the activity pop-up component exists in an activity stack. Because the activity instance corresponding to the activity pop-up component already exists in the current activity stack, in the singleTask mode, the system does not create a new activity instance and removes another activity component that is to obscure the activity pop-up component from the activity stack, and moves the activity pop-up component corresponding to the existing activity instance to the top of the activity stack again. In this case, the pop-up output based on the activity instance is displayed on a system front end again and is not obscured.

Therefore, in the present implementation, to keep the pop-up output by the activity pop-up component not to be obscured by another pop-up or page, the launch mode of the activity pop-up component can be set to the singleTask mode in an initial state.

Step 102: Determine whether the activity pop-up component is obscured by another activity component.

In the Android system, the lifecycle of an activity component usually includes a running state, a pause state, a stop state, and a destroy (disable) state.

The running state is a state that the activity component is visible and can interact with the user. After the activity component is launched, the initial state is the running state. In this case, the activity component is placed on the top of the activity stack and displayed on the system front end (the frontend of the screen).

The pause state is a state that the activity component is obscured by another non-full-sized or semitransparent activity component and is no longer on the top of the activity stack, but is still visible and can interact with the user.

The stop state is a state that the activity component is completely obscured by another activity component and is no longer on the top of the activity stack, and the interaction interface of the activity component is completely hidden.

The destroy state is a state that the activity component is disabled.

The four running states can be switched by using an operation of the user for the activity component.

In the Android system, after the activity component is launched, if the user launches a new activity component by performing an operation, the new activity component is moved to the top of the activity stack to obscure the original activity component. In this case, the system calls the onPause method to switch the original activity component to the pause state.

When the original activity component is completely obscured, the system calls the onStop method to switch the original activity component to the stop state.

When the original activity component is in the pause state or the stop state, and system memory is insufficient, the system calls an onDestroy method to switch the activity component to the destroy state to disable the activity component.

Therefore, in an implementation, the system can determine whether the onPause or onStop method of the activity pop-up component is called, to determine whether the activity pop-up component is obscured by another activity component.

When the onPause or onStop method of the activity pop-up component is called, it can be determined that the activity pop-up component is currently obscured by another activity component and is no longer on the top of the stack.

Step 103: When the activity pop-up component is obscured by another activity component, relaunch the activity pop-up component to trigger movement of the activity pop-up component to the top of an activity stack, so the pop-up is displayed on a system front end.

In the present implementation, when determining that the activity pop-up component is obscured by another activity component, the system can relaunch the activity pop-up component. Because the activity pop-up component is already preconfigured as the singleTask mode, after the activity pop-up component is relaunched, the system removes another activity component that is to obscure the activity pop-up component from the activity stack.

In this case, the activity pop-up component is moved to the top of the activity stack again, and the pop-up output based on the unique activity instance of the activity pop-up component is displayed on the system front end again and is not obscured.

In an implementation, if the system determines that the onPause method of the activity pop-up component is called, the system can confirm that the activity pop-up component is obscured by another activity component.

In this case, logic for relaunching the activity pop-up component can be loaded in the onPause method in advance. For example, the developer can edit execution code used to relaunch the activity pop-up component in the onPause( )method. After calling the onPause method, the system can relaunch the activity pop-up component.

In another implementation, if the system determines that the onStop method of the activity pop-up component is called, the system can confirm that the activity pop-up component is obscured by another activity component. Logic for relaunching the activity pop-up component can also be loaded in the onStop method in advance.

In the Android system, when the system calls the onPause method and the onStop method, the system usually calls the onPause method before the onStop method (the call sequence is a basic processing mechanism of the Android system). However, in some application scenarios such as a concurrent pop-up scenario (that is, the pop-up output by the activity pop-up component is obscured by a pop-up of another activity component just when the activity pop-up component outputs the pop-up), the system may have an abnormal behavior during the sequence of calling the onPause method and the onStop method. To be specific, the system can directly call the onStop method while ignoring the onPause method.

Therefore, for these abnormal application scenarios, to avoid repeatedly processing the activity pop-up component by using the relaunching logic loaded in the onStop method, when the system determines that the onStop method of the activity pop-up component is called, the system can further determine whether the onPause method of the activity pop-up component is called. If the onPause method of the activity pop-up component is already called, it indicates that the activity pop-up component is already processed by executing the relaunching logic loaded in the onPause method. In this case, the system can no longer repeatedly execute the relaunching logic loaded in the onStop method to repeatedly process the activity pop-up component.

Certainly, if the onPause method of the activity pop-up component is not called, an abnormal call can occur in the system, and the system can normally run the relaunching logic loaded in the onStop method to relaunch the activity pop-up component.

It is worthwhile to note that the system can add a mark to a class file of the activity pop-up component, and then check whether there is the corresponding mark in the class file, to determine whether the onPause method of the activity pop-up component is already called.

For example, during implementation, after the system completely processes the activity pop-up component by calling the relaunching logic loaded in the onPause method, the system can add the mark to the class file of the activity pop-up component. The mark is used to indicate that the activity pop-up component is already processed based on the relaunching logic loaded in the onPause method.

When the system determines that the onStop method of the activity pop-up component is called, the system can further check whether there is the mark in the class file of the activity pop-up component, to confirm whether the onPause method of the activity pop-up component is already called. If there is the mark in the class file, it indicates that the activity pop-up component is already processed based on the relaunching logic loaded in the onPause method, and does not need to be repeatedly processed.

It can be seen that by using the method, in an application scenario that an abnormality occurs in a sequence of calling the onPause method and the onStop method, the activity pop-up component can be prevented from being repeatedly processed by using the relaunching logic loaded in the onStop method.

The previously described implementation describes a detailed process that the system determines whether the onPause or onStop method of the activity pop-up component is called to determine whether the activity pop-up component is obscured by another activity component. When the system determines that the activity pop-up component is obscured by another activity component, the system relaunches the activity pop-up component by executing the relaunching logic loaded in the onPause or onStop method. So when the activity pop-up component is preconfigured as the singleTask mode, the activity pop-up component can be moved to the top of the activity stack again, and the output pop-up can be displayed on the system front end again and is not obscured.

However, in the Android system, the system calls the onPause method or the onStop method not only when the activity pop-up component is obscured by another activity component, but also when the user executes a normal disabling event to disable the activity pop-up component.

For example, when the activity component is in the running state, if the system detects a disabling event of the user for the activity component, the system sequentially calls the onPause method and the onStop method to successively switch the activity component to the pause state and the stop state, and then automatically calls the onDestroy method to switch the activity component to the destroy state to disable the activity component.

The disabling event can include an event corresponding to a disabling operation performed by the user for the activity pop-up component. For example, for a touchscreen smartphone running the Android system, the disabling event can include a tap event of the user for a back key on the mobile phone. To be specific, the user can tap the back key on the mobile phone to disable the activity pop-up component. When detecting the tap event of the user for the back key on a back end, the mobile phone system can sequentially call the onPause method and the onStop method to successively switch the activity component to the pause state and the stop state, and then automatically call the onDestroy method to disable the activity component.

It can be seen that in the application scenario that the user normally disables the activity pop-up component, the call of the onPause method or the onStop method is triggered by a normal disabling operation of the user instead of an event that the activity pop-up component is obscured by another activity component. Therefore, if the system still relaunches the activity pop-up component by executing the relaunching logic loaded in the onPause method or the onStop method of the activity pop-up component, a misoperation of the user is caused (to be specific, the user expects to disable the activity pop-up component, but relaunches the activity pop-up component by using the relaunching logic instead).

Therefore, to avoid the misoperation, when the system determines that the onPause method or the onStop method of the activity pop-up component is called, before the system relaunches the activity pop-up component based on the relaunching logic loaded in the onPause method or the onStop method, the system can further determine whether the call of the onPause method or the onStop method is triggered by the user for the disabling event of the activity pop-up component.

If the call of the onPause method or the onStop method is triggered by the user for the disabling event of the activity pop-up component, it is a normal disabling procedure for the activity pop-up component, and the system can allow the activity pop-up component to be normally disabled, respond to the normal disabling procedure for the activity pop-up component, and automatically call the onDestroy method of the activity pop-up component to disable the activity pop-up component.

Certainly, if the call of the onPause method or the onStop method is not triggered by the user for the disabling event of the activity pop-up component, the system can normally execute the relaunching logic loaded in the onPause method or the onStop method to relaunch the activity pop-up component, and move the activity pop-up component to the top of the activity stack.

It is worthwhile to note that the system can add a mark to a class file of the activity pop-up component, and then check whether there is the corresponding mark in the class file, to determine whether the call of the onPause method or the onStop method is triggered by the user for the disabling event of the activity pop-up component.

For example, during implementation, after the system detects the disabling event of the user for the activity pop-up component to call the onPause method and the onStop method, the system can add the mark to the class file of the activity pop-up component. The mark is used to indicate that the call of the onPause method and the onStop method is triggered by the user for the disabling event of the activity pop-up component.

When the system determines that the onPause method or the onStop method is called, the system can further check whether there is the mark in the class file of the activity pop-up component. If there is the mark in the class file, it indicates that the call of the onPause method and the onStop method is triggered by the user for the disabling event of the activity pop-up component. In this case, the system can respond to the normal disabling procedure for the activity pop-up component.

It can be seen that by using the method, in an application scenario that the user normally disables the activity pop-up component, a problem of a misoperation caused by executing the relaunching logic loaded in the onPause method or the onStop method of the activity pop-up component, when the activity pop-up component is relaunched, can be avoided.

The technical solutions in the previously described implementation are described below in detail with reference to specific application scenarios.

An application scenario shown in the present implementation can include a single device login application scenario and an incoming call answering application scenario.

In the single device login application scenario, the trigger event prompted by the pop-up can include a single device login event. In the application scenario, the user can log in to the terminal by using a login account, and a login server corresponding to the terminal can verify the login account. After the login server successfully verifies the login account, the user successfully logs in to the terminal.

When the user logs in to another terminal by using the same login account, the login server sends a notification message to the current login terminal to trigger the current login terminal to exit the login state. After receiving the notification message sent by the server, the current login terminal can consider that a single device login event is detected. In this case, the current login terminal can exit the login state, and output a single device login pop-up to the user. A prompt text used to prompt the user with the reason for exiting the current login state can be filled in the pop-up.

When the system launches the activity pop-up component to output the single device login pop-up, to prevent the output pop-up from being obscured by another pop-up or page, the system can set the running state of the activity pop-up component to the singleTask mode by default.

When the activity pop-up component is obscured by another activity component, the system calls the onPause method or the onStop method. The relaunching logic is loaded in the onPause method or the onStop method in advance. After executing the relaunching logic in the onPause method or the onStop method, the system can relaunch the activity pop-up component.

Because the activity pop-up component is preconfigured as the singleTask mode, after the activity pop-up component is relaunched, the system removes another activity component that is to obscure the activity pop-up component from the activity stack, and moves the activity pop-up component to the top of the activity stack again. In this case, the single device login pop-up is displayed on the system front end again and is not obscured by another pop-up or page. Because the other activity component that is to obscure the activity pop-up component is directly removed from the activity stack, an interaction interface corresponding to the other activity component cannot be displayed, and the user cannot perceive the page change.

It can be seen that in the single device login application scenario, a problem that prompt information cannot be prompted to the user in time because the single device login pop-up is obscured can be avoided by using the method.

In the incoming call answering application scenario, the trigger event prompted by the pop-up can include an incoming call event. In the application scenario, when detecting an incoming call, the terminal system can output an incoming call pop-up to the user to prompt the user that an incoming call is detected. A prompt text used to prompt the user with the initiator of the incoming call can be filled in the pop-up. The user can perform a corresponding operation for the pop-up, for example, sliding upwards or sliding downwards to answer the incoming call or decline the incoming call.

In the scenario, if the incoming call pop-up output by the system when detecting the incoming call is obscured by another pop-up or page, a compatibility problem that the user cannot perform an operation for the incoming call pop-up to answer the incoming call, or a key (such as a home key) of the terminal is unable to function when the incoming call pop-up is obscured is possibly caused.

When the system launches the activity pop-up component to output the incoming call pop-up, to prevent the output pop-up from being obscured by another pop-up or page, the system can set the running state of the activity pop-up component to the singleTask mode by default.

When the activity pop-up component is obscured by another activity component, the system calls the onPause method or the onStop method. The relaunching logic is loaded in the onPause method or the onStop method in advance. After executing the relaunching logic in the onPause method or the onStop method, the system can relaunch the activity pop-up component.

Because the activity pop-up component is preconfigured as the singleTask mode, after the activity pop-up component is relaunched, the system removes another activity component that is to obscure the activity pop-up component from the activity stack, and moves the activity pop-up component to the top of the activity stack again. In this case, the incoming call pop-up is displayed on the system front end again and is not obscured by another pop-up or page. Because the other activity component that is to obscure the activity pop-up component is directly removed from the activity stack, an interaction interface corresponding to the other activity component cannot be displayed, and the user cannot perceive the page change.

It can be seen that in the incoming call answering application scenario, a compatibility problem with the terminal key, where the user cannot answer the incoming call because the incoming call is obscured by the pop-up, can be avoided by using the method.

Certainly, in addition to the application scenarios described above, the technical solutions in the described implementation can be further applied to another similar scenario. To be specific, in actual applications, in addition to the application scenarios described above, an application scenario applicable to the technical solutions in the described implementation can further include all application scenarios that a pop-up needs to be output to prompt the user, and the use of an APP or a basic function in the system is possibly affected when the output pop-up is obscured by another pop-up or page. Enumeration is omitted in the present application.

In the previously described implementation, when the trigger event prompted by the pop-up is detected, the activity pop-up component is launched to output the pop-up, and the launch mode of the activity pop-up component is preconfigured as the single task mode. It is determined whether the activity pop-up component is obscured by another activity component. When the activity pop-up component is obscured by another activity component, the activity pop-up component is relaunched to trigger movement of the activity pop-up component to the top of the activity stack, so the pop-up is displayed on the system front end. Because the activity pop-up component is in the single task mode in the present application, the activity pop-up component can be immediately moved to the top of the activity stack after being relaunched. Therefore, after the activity pop-up component is launched to output the pop-up to the user, it can be ensured that the pop-up is not obscured and is always displayed on the system front end.

In addition, in the present application, the pop-up is no longer output based on the window component in the Android system, and the user is no longer allowed to configure the pop-up. This avoids a problem that the pop-up cannot be output because the user manually prohibits the pop-up in the system.

Moreover, because the pop-up is output by using the activity pop-up component in the present application, any activity component in the system can be used as the main body to output the pop-up on any page, achieving high flexibility.

Corresponding to the described method implementation, the present application further provides a device implementation.

Figure 2:
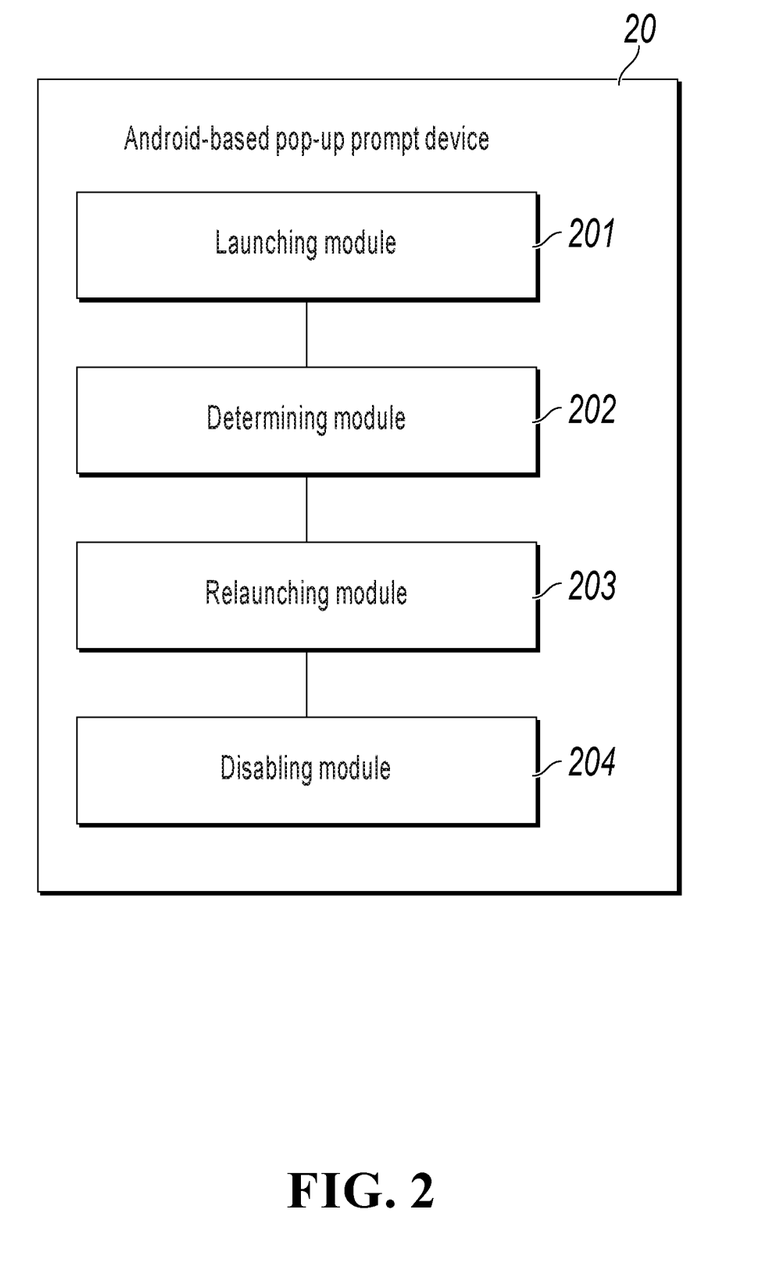
FIG. 2 is a logical block diagram illustrating an Android-based pop-up prompt device, according to an implementation of the present application.
Figure 3:
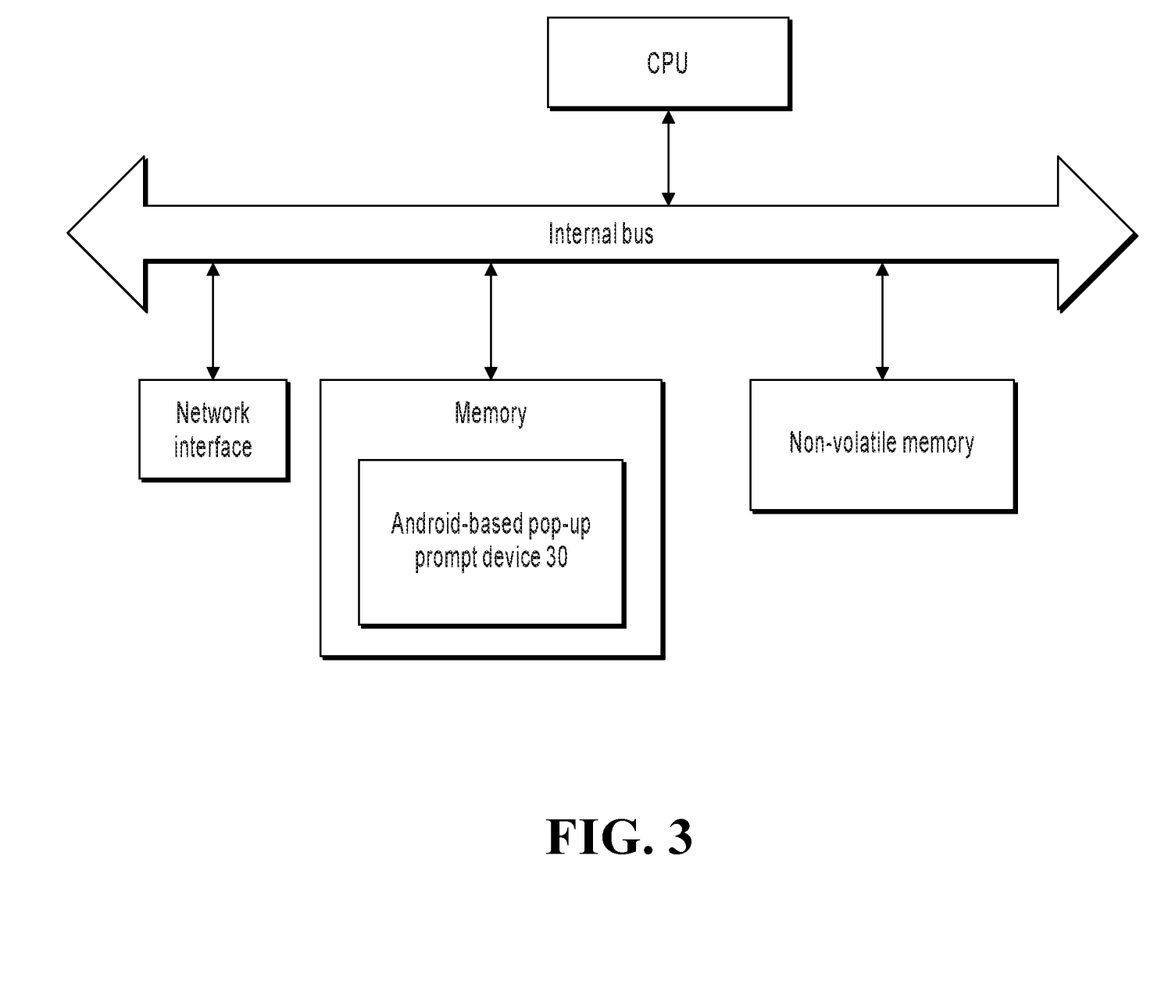
FIG. 3 is a structural diagram illustrating hardware of a terminal including the Android-based pop-up prompt device, according to an implementation of the present application.

Referring to FIG. 2, the present application provides an Android-based pop-up prompt device 20, applied to a terminal. Referring to FIG. 3, a hardware architecture of the terminal including the Android-based pop-up prompt device 20 usually includes a CPU, a memory, a non-volatile memory, a network interface, an internal bus, etc. By using software implementation as an example, the Android-based pop-up prompt device 20 usually can be understood as a computer program loaded in the memory. After the CPU runs the computer program, a logic device that combines software with hardware is formed. The device 20 includes the following: a launching module 201, configured to launch an activity pop-up component to output the pop-up when a trigger event prompted by a pop-up is detected, where a launch mode of the activity pop-up component is preconfigured as a single task mode; a determining module 202, configured to determine whether the activity pop-up component is obscured by another activity component; and a relaunching module 203, configured to relaunch the activity pop-up component to trigger movement of the activity pop-up component to the top of an activity stack when the activity pop-up component is obscured by another activity component, so the pop-up is displayed on a system front end.

In the present implementation, the determining module 202 is configured to determine whether an onPause or onStop method of the activity pop-up component is called; and when the onPause or onStop method of the activity pop-up component is called, determine that the activity pop-up component is obscured by another activity component.

In the present implementation, the relaunching module 203 is configured to relaunch the activity pop-up component based on the onPause method when the onPause method of the activity pop-up component is called; and when the onStop method of the activity pop-up component is called, determine whether the onPause method of the activity pop-up component is already called, and if the onPause method is not called, relaunch the activity pop-up component based on the onStop method.

In the present implementation, the relaunching module 203 is further configured to determine whether the call of the onPause method or the onStop method is triggered by a disabling event for the activity pop-up component; and if the call of the onPause method or the onStop method is not triggered by the disabling event for the activity pop-up component, relaunch the activity pop-up component based on the onPause method or the onStop method.

In the present implementation, the device 20 further includes the following: a disabling module 204, configured to normally disable the activity pop-up component if the call of the onPause method or the onStop method is triggered by the disabling event for the activity pop-up component.

A person skilled in the art can easily figure out another implementation solution of the present application after considering the specification and practicing the present disclosure disclosed here. The present application is intended to cover any variations, functions, or adaptive changes of the present application. These variations, functions, or adaptive changes comply with general principles of the present application, and include common knowledge or a commonly used technical means in the technical field that is not disclosed in the present application. The specification and the implementations are merely considered as examples, and the actual scope and the spirit of the present application are pointed out by the following claims.

It should be understood that the present application is not limited to the accurate structures that are described above and that are shown in the accompanying drawings, and modifications and changes can be made without departing from the scope of the present application. The scope of the present application is limited only by the appended claims.

The described descriptions are merely examples of implementations of the present application, but are not intended to limit the present application. Any modification, equivalent replacement, or improvement made without departing from the spirit and principle of the present application shall fall within the protection scope of the present application.

Figure 4:
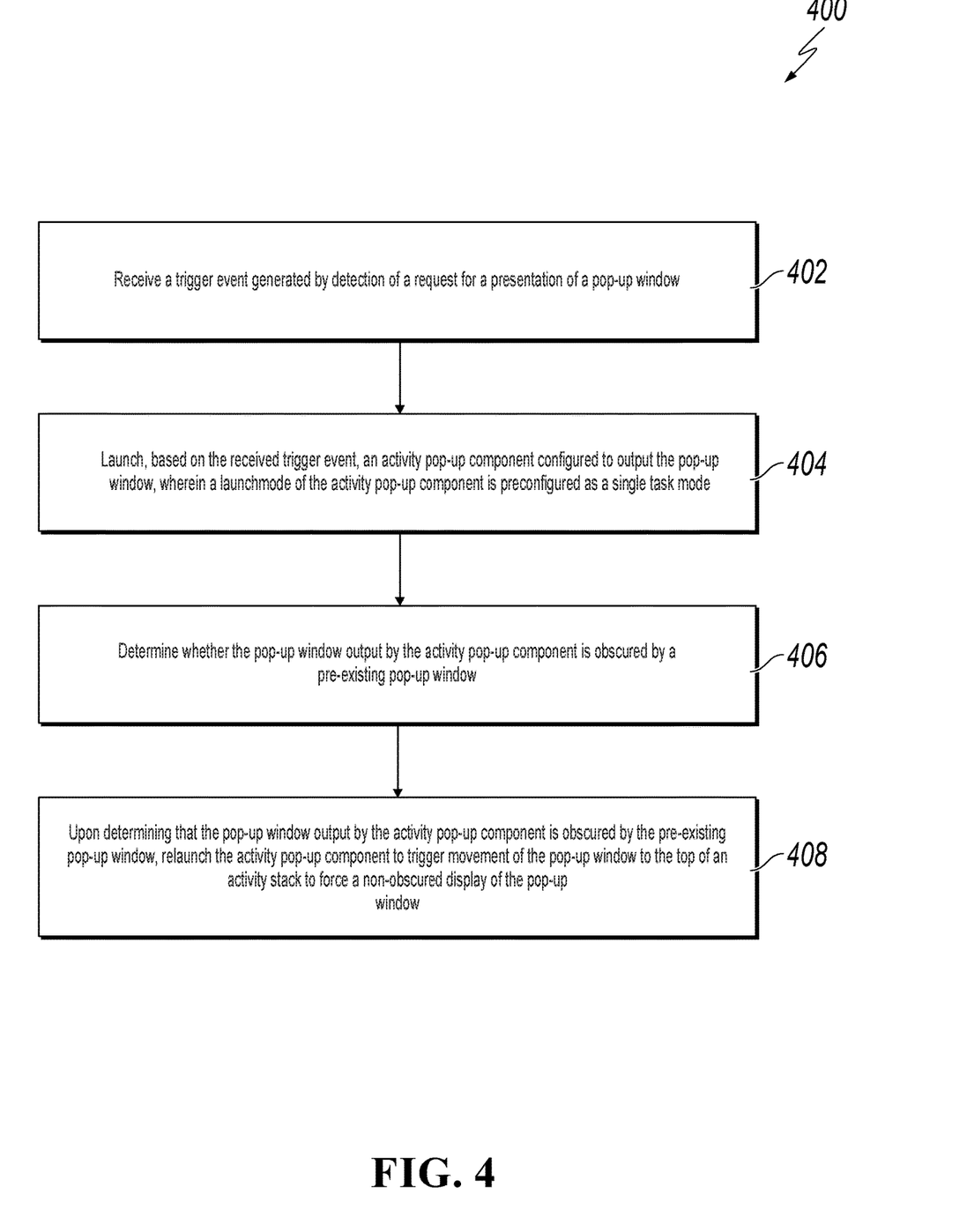
FIG. 4 is a flowchart illustrating an example of a computer-implemented method for relaunching an activity pop-up component, according to an implementation of the present disclosure.

FIG. 4 is a flowchart illustrating an example of a computer-implemented method 400 for relaunching an activity pop-up component, according to an implementation of the present disclosure. For example, the activity pop-up component can be relaunched to trigger movement of the pop-up window to the top of an activity stack when the pop-up window is obscured. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a trigger event is received that is generated by detection of a request for a presentation of a pop-up window. For example, the trigger event can be a single device login event that is received on an Android device such as the Android-based pop-up prompt device 20. The trigger event can occur, for example, when the user tries to login to another terminal by using the same login account. In this example, the current terminal in use by the user can be configured to exit the login state and output a pop-up window that notifies the user with the reason for exiting the current login state. From 402, method 400 proceeds to 404.

At 404, based on the received trigger event, an activity pop-up component is launched that is configured to output the pop-up window, where a launch mode of the activity pop-up component is preconfigured as a single task mode. As an example, the launching module 201 can launch the activity pop-up component to display a pop-up window on the Android-based pop-up prompt device 20. From 404, method 400 proceeds to 406.

At 406, a determination is made whether the pop-up window output by the activity pop-up component is obscured by a pre-existing pop-up window. As an example, the determining module 202 can determine whether the activity pop-up component is obscured by another activity component.

In some implementations, determining whether the pop-up window is obscured by the pre-existing pop-up window includes determining whether particular methods have been called. For example, the determining module 202 can determine whether the onPause method or the onStop method of the activity pop-up component is called. If a determination is made that either one of the onPause method or the onStop method of the activity pop-up component is called, then the determining module 202 can make the determination that the pop-up window is obscured by the pre-existing pop-up window.

In some implementations, method 400 can further includes steps for disabling the activity pop-up component. For example, upon determining that the call of the onPause method or the onStop method is triggered by the disabling event for the activity pop-up component, the disabling module 204 can disable the activity pop-up component in the normal way. From 406, method 400 proceeds to 408.

At 408, upon determining that the pop-up window output by the activity pop-up component is obscured by the pre-existing pop-up window, the activity pop-up component is relaunched to trigger movement of the pop-up window to the top of an activity stack to force a non-obscured display of the pop-up window. As an example, the relaunching module 203 can relaunch the activity pop-up component to trigger movement of the activity pop-up component to the top of an activity stack so that the pop-up window is displayed on a system front end.

In some implementations, relaunching the activity pop-up component can depend on which methods have been called. When the onPause method of the activity pop-up component is called, for example, the relaunching module 203 can relaunch the activity pop-up component based on the onPause method. When the onStop method of the activity pop-up component is called, for example, the relaunching module 203 can determine whether the onPause method of the activity pop-up component is already called. Then, if the onPause method is not called, the relaunching module 203 can relaunch the activity pop-up component based on the onStop method. In another example, the relaunching module 203 can determine whether the call of the onPause method or the onStop method is triggered by a disabling event for the activity pop-up component. If the relaunching module 203 determines that the call of the onPause method or the onStop method is not triggered by the disabling event for the activity pop-up component, then the relaunching module 203 can relaunch the activity pop-up component based on the onPause method or the onStop method. After 408, method 400 stops.

The present disclosure describes techniques and conditions for relaunching an activity pop-up component in order to force the display of a corresponding pop-up window. The relaunching can be necessary on some devices, for example, when a launched pop-up window is determined to be obscured after the pop-up window is initially launched. This can happen after the system outputs the pop-up window to the user. If the system front-end displays another page, the user cannot view the pop-up window output by the system unless the user actively switches to the login page. The relaunching can force the pop-up window to be displayed, allowing the user to view critical information that would otherwise be obscured.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method of launching pop-up components, the method comprising:
    receiving a trigger event generated by detection of a request for a presentation of a pop-up window:
    launching, based on the receives trigger event, an activity pop-up component configured to output the pop-up window, wherein a launch mode of the activity pop-up component is preconfigured as a single task mode prohibiting pop-up window outputs by pop-up window restrictions provided by a user input;
    determining whether an onPause method of the activity pop-up component is called, wherein the onPause method causes the activity pop-up component to be in a cause state;
    in response to determining that the onPause method of the activity pop-up component is called, determining that the pop-up window output by the activity pop-up component is obscured by a pre-existing pop-up window; and
    in response to determining that the pop-up window output by the activity pop-up component is obscured by the pre-existing pop-up window, relaunching the activity pop-up component based on the onPause method to trigger movement of the pop-up window to the top of an activity stack to force a non-obscured display of the pop-up window that at least partly overlaps the activity stack, wherein before relaunching the activity pop-up component, determining whether the onPause method is triggered by a user for a disabling event of the activity pop-up component and processing a normal disabling procedure if the onPause method is triggered by a user for the disabling event.

2. The computer-implemented method of claim 1, wherein the trigger event is received on an Android device.

3. The computer-implemented method of claim 1, wherein the trigger event is single device login event.

4. A non-transitory, computer-readable medium storing one or more instructions executable by a computer system to perform operations of launching pop-up components, the operations comprising:
    receiving a trigger event generated by detection of a request for a presentation of a pop-up window; launching, based on the received trigger event, an activity pop-up component configured to output the pop-up window, wherein a launch mode of the activity pop-up component is preconfigured as a single task mode prohibiting pop-up window outputs by pop-up window restrictions provided by a user input;

determining whether an onPause method of the activity pop-up component is called, wherein the onPause method causes the activity pop-up component to be in a pause state;

in response to determining that the onPause method of the activity pop-up component is called, determining that the pop-up window output by the activity pop-up component is obscured by a pre-existing pop-up window; and in response to determining that the pop-up window output by the activity pop-up component is obscured by the pre-existing pop-up window, relaunching the activity pop-up component based on the onPause method to trigger movement of the pop-up window to the top of an activity stack to force anon-obscured display of the pop-up window that at least partly overlaps the activity stack, wherein before relaunching the activity pop-up component, determining whether the onPause method is triggered by a user for a disabling event of the activity pop-up component and processing a normal disabling procedure if the onPause method is triggered by a user for the disabling event.

5. The non-transitory, computer-readable medium of claim 4, wherein the trigger event is received on an Android device.

6. The non-transitory, computer-readable medium of claim 4, wherein the trigger event is single device login event.

7. A computer-implemented system of launching pop-up components, computer-implemented system comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a trigger event generated by detection of a request for a presentation of a pop-up window;

launching, based on the received trigger event, an activity pop-up component configured to output the pop-up window, wherein a launch mode of the activity pop-up component is preconfigured as a single task mode prohibiting pop-up window outputs by pop-u window restrictions provided by a user input;

determining whether an onPause method of the activity pop-up component is called, wherein the onPause method causes the activity pop-up component to be in a pause state;

in response to determining that the onPause method of the activity pop-up component is called, determining that the pop-up window output by the activity pop-up component is obscured by a pre-existing pop-up window; and in response to determining that the pop-up window output by the activity pop-up component is obscured by the pre-existing pop-up window, relaunching the activity pop-up component based on the onPause method to trigger movement of the pop-up window to the top of an activity stack to force a non-obscured display of the pop-up window that at least partly overlaps the activity stack, wherein before relaunching the activity pop-up component, determining whether the onPause method is triggered by a user for a disabling event of the activity pop-up component and processing a normal disabling procedure if the onPause method is triggered by a user for the disabling event.

8. The computer-implemented system of claim 7, wherein the trigger event is received on an Android device.

* * * * *

UNITED STATES PATENT AND TRADEMARK OFFICE
CERTIFICATE OF CORRECTION

PATENT NO. : 10,678,564 B2
APPLICATION NO. : 16/131701
DATED : June 9, 2020
INVENTOR(S) : Xiangyu Zhao and Liangzi Ding It is certified that error appears in the above-identified patent and that said Letters Patent is hereby corrected as shown below:

On the Title Page

Item (30), Column 1 (Foreign Application Priority Data) – Delete "2016 1 015785" and insert -- 2016 1 0150785 --, therefor.

In the Claims

Column 16/Line 25 – In Claim 1, delete "window:" and insert -- window; --, therefor.

Column 16/Line 26 – In Claim 1, delete "receives" and insert -- received --, therefor.

Column 16/Line 35 – In Claim 1, delete "cause" and insert -- pause --, therefor.

Column 17/Line 17 – In Claim 4, delete "anon-obscured" and insert -- a non-obscured --, therefor.

Column 18/Line 10 – In Claim 7, delete "pop-u" and insert -- pop-up --, therefor.

Signed and Sealed this
Third Day of November, 2020

Andrei Iancu
*Director of the United States Patent and Trademark Office*